(12) United States Patent
Cariccia et al.

(10) Patent No.: US 12,385,560 B2
(45) Date of Patent: Aug. 12, 2025

(54) FILTERING PULLEY

(71) Applicant: PROPULSION SOLUTIONS S.R..L., Ivrea (IT)

(72) Inventors: Gianluca Cariccia, San Bernardo d'Ivrea (IT); Andrea Guala, San Bernardo d'Ivrea (IT); Gilberto Delle Rose, San Bernardo d'Ivrea (IT)

(73) Assignee: MUVIQ S.R.L., Ivrea (IT)

( * ) Notice: Subject to any disclaimer, the term of this patent is extended or adjusted under 35 U.S.C. 154(b) by 0 days.

(21) Appl. No.: 18/699,413

(22) PCT Filed: Oct. 5, 2022

(86) PCT No.: PCT/IB2022/059491
§ 371 (c)(1),
(2) Date: Apr. 8, 2024

(87) PCT Pub. No.: WO2023/057913
PCT Pub. Date: Apr. 13, 2023

(65) Prior Publication Data
US 2024/0410459 A1  Dec. 12, 2024

(30) Foreign Application Priority Data

Oct. 8, 2021 (IT) .................. 102021000025901

(51) Int. Cl.
*F16H 55/36* (2006.01)
*F16F 15/123* (2006.01)

(52) U.S. Cl.
CPC ......... *F16H 55/36* (2013.01); *F16F 15/1232* (2013.01); *F16F 2236/08* (2013.01); *F16H 2055/366* (2013.01)

(58) Field of Classification Search
CPC ............. F16H 55/36; F16H 2055/366; F16H 2055/306; F16F 15/1232
USPC ..................................... 474/70, 94
See application file for complete search history.

(56) References Cited

U.S. PATENT DOCUMENTS

| | | | | |
|---|---|---|---|---|
| 2,955,443 A * | 10/1960 | Fulop | ....... | F16D 7/08 |
| | | | | 464/36 |
| 5,393,266 A * | 2/1995 | Braun | ....... | F16F 15/127 |
| | | | | 192/70.17 |
| 5,944,156 A * | 8/1999 | Hatakeyama | ....... | F16D 43/2028 |
| | | | | 192/209 |
| 6,109,227 A * | 8/2000 | Mott | ....... | F16H 7/06 |
| | | | | 123/90.31 |
| 7,399,245 B2 * | 7/2008 | Spintzyk | ....... | F16D 3/66 |
| | | | | 474/94 |

(Continued)

OTHER PUBLICATIONS

International Search Report and Written Opinion, Application No. PCT/IB2022/059491, Jan. 2, 2023, p. 1-9.

*Primary Examiner* — Henry Y Liu
(74) *Attorney, Agent, or Firm* — FisherBroyles, LLP; Susan M. Oiler

(57) ABSTRACT

A filtering pulley for an accessory transmission of an internal combustion engine has a hub, a crown, a filtering unit for transmitting the torque that is interposed between the hub and the crown, a torsion spring, a carrier, and a torque limiting joint. The torque limiting joint has an open-loop strip spring and is configured to slide with respect to a surface of the crown when the torque transmitted between the crown and the hub reaches a predetermined level.

15 Claims, 4 Drawing Sheets

(56) References Cited

U.S. PATENT DOCUMENTS

| | | | | |
|---|---|---|---|---|
| 7,803,056 B2* | 9/2010 | Nosaka | | F16D 7/02 464/30 |
| 8,177,669 B2* | 5/2012 | Ishida | | F16H 55/36 474/166 |
| 8,202,183 B2* | 6/2012 | Riu | | F16D 41/203 474/70 |
| 8,272,982 B2* | 9/2012 | Fitz | | F16H 55/36 474/70 |
| 8,506,434 B2* | 8/2013 | Harvey | | F16D 47/04 464/57 |
| 8,529,387 B2* | 9/2013 | Lannutti | | F16D 13/76 192/113.32 |
| 8,602,928 B2* | 12/2013 | Serkh | | F16D 3/12 474/70 |
| 8,641,563 B2* | 2/2014 | Mende | | F16F 15/1297 474/94 |
| 8,678,157 B2* | 3/2014 | Ward | | F16D 7/022 474/94 |
| 8,820,503 B2* | 9/2014 | Schneider | | F16D 41/206 474/94 |
| 8,931,610 B2* | 1/2015 | Serkh | | F16D 3/12 474/94 |
| 8,944,947 B2* | 2/2015 | Yamatani | | F16H 55/36 474/166 |
| 9,033,832 B1* | 5/2015 | Serkh | | F16D 41/206 474/70 |
| 9,068,608 B2* | 6/2015 | Serkh | | F16D 41/206 |
| 9,097,335 B2* | 8/2015 | Serkh | | F16D 41/206 |
| 9,140,319 B2* | 9/2015 | Williams | | F16D 3/12 |
| 9,169,914 B2* | 10/2015 | Serkh | | F16D 3/72 |
| 9,181,989 B2* | 11/2015 | Mevissen | | F16D 13/76 |
| 9,206,892 B2* | 12/2015 | Serkh | | F16D 41/04 |
| 9,605,743 B2* | 3/2017 | Canto Michelotti | | F16D 3/12 |
| 9,611,928 B2* | 4/2017 | Li | | F16H 55/36 |
| 9,689,486 B2* | 6/2017 | Williams | | F16D 13/76 |
| 9,850,997 B2* | 12/2017 | Cariccia | | F16F 15/1216 |
| 9,982,769 B2* | 5/2018 | Hauck | | F16H 55/36 |
| 10,113,596 B2* | 10/2018 | Nakajima | | F16D 3/68 |
| RE47,143 E* | 11/2018 | Mevissen | | F02B 67/06 |
| 10,393,190 B2* | 8/2019 | Williams | | F16D 41/206 |
| 10,415,650 B2* | 9/2019 | Gersmann | | F16D 43/2024 |
| 10,520,039 B2* | 12/2019 | Serkh | | F16D 41/206 |
| 10,774,916 B2* | 9/2020 | Canto Michelotti | | F16H 55/36 |
| 11,236,812 B2* | 2/2022 | Canto Michelotti | | F16D 3/72 |
| 11,585,390 B2* | 2/2023 | Cariccia | | F02B 67/06 |
| 11,649,888 B2* | 5/2023 | Serkh | | F16H 55/36 474/70 |
| 2006/0089224 A1* | 4/2006 | Nosaka | | F16D 9/06 474/170 |
| 2007/0021250 A1* | 1/2007 | Spintzyk | | F16D 3/12 464/62.1 |
| 2008/0207364 A1* | 8/2008 | Schebitz | | F16H 55/36 474/94 |
| 2008/0312014 A1* | 12/2008 | Stief | | F16F 15/123 474/94 |
| 2009/0121401 A1* | 5/2009 | Lehmann | | F16H 55/36 267/215 |
| 2009/0197719 A1* | 8/2009 | Ali | | F16D 7/022 474/94 |
| 2011/0015018 A1* | 1/2011 | Yamatani | | F02N 15/023 474/166 |
| 2011/0065537 A1* | 3/2011 | Serkh | | F16F 15/1216 474/94 |
| 2011/0256968 A1* | 10/2011 | Serkh | | F16D 3/12 474/70 |
| 2011/0263365 A1* | 10/2011 | Mende | | F16F 15/1297 474/94 |
| 2012/0186938 A1* | 7/2012 | Harvey | | F16H 55/36 192/41 S |
| 2012/0298474 A1* | 11/2012 | Ward | | F16H 55/36 192/41 S |
| 2013/0118853 A1* | 5/2013 | Champalou | | F16D 7/005 192/56.62 |
| 2013/0161150 A1* | 6/2013 | McCrary | | F16D 13/76 192/93 R |
| 2013/0237351 A1* | 9/2013 | Marion | | F16D 7/00 474/70 |
| 2013/0267361 A1* | 10/2013 | Cali | | F16D 3/02 474/70 |
| 2014/0008175 A1* | 1/2014 | Schneider | | F16D 41/206 192/41 S |
| 2014/0141892 A1* | 5/2014 | Williams | | F16D 13/76 464/40 |
| 2014/0305765 A1* | 10/2014 | Serkh | | F16D 7/022 192/41 S |
| 2014/0329631 A1* | 11/2014 | Mevissen | | F16D 13/12 474/166 |
| 2015/0027844 A1* | 1/2015 | Serkh | | F16H 55/36 192/75 |
| 2015/0167816 A1* | 6/2015 | Li | | F16D 3/12 474/166 |
| 2015/0252884 A1* | 9/2015 | Serkh | | F16H 55/36 474/94 |
| 2015/0276039 A1* | 10/2015 | Williams | | F16D 41/206 474/94 |
| 2015/0285365 A1* | 10/2015 | Canto Michelotti | | F16D 3/72 474/94 |
| 2015/0285366 A1* | 10/2015 | Serkh | | F16D 41/203 474/94 |
| 2016/0016225 A1* | 1/2016 | Serkh | | B21F 35/02 29/896.9 |
| 2016/0138700 A1* | 5/2016 | Hauck | | F16H 55/36 474/94 |
| 2016/0195182 A1* | 7/2016 | Cariccia | | F16H 55/36 474/94 |
| 2017/0122384 A1* | 5/2017 | Nakajima | | F16D 13/76 |
| 2017/0227108 A1* | 8/2017 | Canto Michelotti | | F16H 55/36 |
| 2017/0261042 A1* | 9/2017 | Gersmann | | F16H 55/36 |
| 2017/0261046 A1* | 9/2017 | Williams | | F16H 55/36 |
| 2018/0106355 A1* | 4/2018 | Canto Michelotti | | F16D 3/72 |
| 2019/0063507 A1* | 2/2019 | Serkh | | F16D 7/022 |
| 2020/0141451 A1* | 5/2020 | Cariccia | | F16D 3/12 |

* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2022/059491, filed Oct. 10, 2022, which designated the United States and which claims the benefit of Italian Patent Application No. 102021000025901, filed on Oct. 8, 2021, the entire disclosure of which is incorporated herein by reference.

TECHNICAL SECTOR

This invention relates to a filtering pulley, in particular for a belt transmission of an internal combustion engine of a motor vehicle.

The preferred application of this invention, though not the exclusive one, is in the drive pulley of an alternator of an internal combustion engine. Reference will be made to this application below by way of example, it being, nonetheless, clear that the invention's pulley may be used as a driving pulley connected to the engine shaft or as a driven pulley for driving any other accessory of the engine itself, for example a reversible electric motor with the function of generator and motor.

PRIOR ART

In motor vehicles the use of a filtering pulley is known for driving the alternator using the accessory transmission belt.

This pulley comprises a hub designed to be connected to the rotor of the alternator, an annular crown provided with a profile designed to cooperate with the belt, and a filtering unit interposed between the hub and the crown of the pulley in order to avoid subjecting the belt to dynamic overloads when there are torsion vibrations of the engine shaft or quick changes in speed of the engine itself.

The filtering unit generally comprises a spring, for example a helical or spiral spring, or multiple springs or other elastic elements arranged circumferentially between the hub and the crown.

Since the alternator has a relatively high equivalent inertia and tends to drive the pulley when there are instantaneous speed reductions of the engine shaft, it is known to incorporate, in the filtering unit, a free wheel designed to transmit, in one direction, the motion of the crown to the hub (normal operating condition) but to decouple the hub from the crown if the torque is reversed.

The introduction of start-stop systems in which a reversible electric motor that has the function of a drive motor or alternator, depending on the operating conditions, is used makes it impossible to use a filtering pulley with a free wheel since this would decouple the electric motor, when driving, from the belt transmission.

To resolve this problem, solutions have been proposed in which the filtering unit comprises a spring attached at its ends to respective elements respectively coupled to the hub and to the pulley with relative freedom of rotation of a predetermined width.

An example of a known solution to this problem is illustrated in WO 2015/198277 A1. In any case, this solution is not optimised enough to ensure the desired technical performance. Moreover, this solution is radially and axially bulky.

There is, therefore, a need to provide a filtering pulley that can be used both in a start-stop system and in a conventional transmission system, which resolves the problems of the known filtering pulleys described above.

Another purpose of this invention is to produce a filtering pulley, which is both compact and inexpensive to manufacture.

SUMMARY OF THE INVENTION

The above-mentioned purpose is achieved with a pulley for an accessory transmission of an internal combustion engine that has a hub, an annular crown provided with a profile configured to cooperate with a transmission belt, which is externally coaxial around an axis to the hub and is supported in free rotational motion on the hub itself, a filtering unit for transmitting the torque interposed between the hub and the crown, a torsion spring, a carrier, and a torque limiting joint. The carrier cooperates by sliding with respect to a portion integral with one of the hub and the crown. The carrier defines a spring holder and a projection extending along the axis that is configured to cooperate with the torque limiting joint. The torsion spring is operatively interposed between the carrier and one of the hub and crown and is provided with two ends cooperating in contact with respective spring holders integral with the carrier and one of the hub and crown. The torque limiting joint is coupled by interference on one surface of the other of the hub and crown. The torque limiting joint is an open loop strip spring that is configured to slide with respect to the surface when the torque transmitted between the crown and the hub reaches a predetermined level. The strip spring defines a pair of axial projections configured to cooperate selectively circumferentially in contact with, respectively, at least one axial projection integral with the hub and at least one projection axial integral with the carrier.

Additional, preferred embodiments of the invention are constructed according to the following:

The axial projection carried by the hub defines a seat within which the axial projection can move circumferentially. The seat extends angularly by an angle (B) included between 130° and 150° or defines a seat within which the axial projection can move circumferentially. More preferably, the seat extends angularly by an angle (a) included between 35° and 45°.

The limiting joint has an actuator element housed in a space circumferentially delimited between two ends of the strip spring. The actuator element can be axially dimensioned to cooperate in contact, on the one hand, with the projection of the carrier and, on the other, the projection of the hub. The actuator element is a metal lever able to expand the spring under the thrust of the projection of the carrier. One of the two ends of the strip spring defines a circumferential protuberance extending into the space and configured to cooperate in contact with the actuator element, the protuberance extending in proximity of the axial projection cooperating with the projection integral with the hub. The actuator element has a trapezoidal section, where the plan of the section is circumferential, and the thickness of the actuator element is radial. The trapezoidal section defines a pair of equal inclined lateral portions. The inclination of the inclined side portions is between 20° and 40°.

In all embodiment, the portion integral with the hub can have an annular head on which a bearing is mounted to support the crown.

In all embodiments, the projections can be made on a flanged portion integral with the hub. The flanged portion being sized to wrap, in part, externally the torsion spring. The pulley comprises a sliding bearing operatively interposed between the flanged portion and the crown.

In all embodiments, the carrier can define a radial projection defining a spring holder for one of the two ends of the torsion spring.

The pulley comprises a damping ring operatively interposed between the carrier and the portion integral with the hub, and the damping can be configured to allow the sliding of the carrier with respect to the portion. The damping ring comprises a portion radially interposed between the crown and the carrier and a portion interposed between the carrier and the portion integral with the hub.

BRIEF DESCRIPTION OF THE DRAWINGS

To better understand this invention a preferred embodiment is described below, by way of non-limiting example and with reference to the attached drawings, in which.

DETAILED DESCRIPTION OF THE INVENTION

Figure 1:
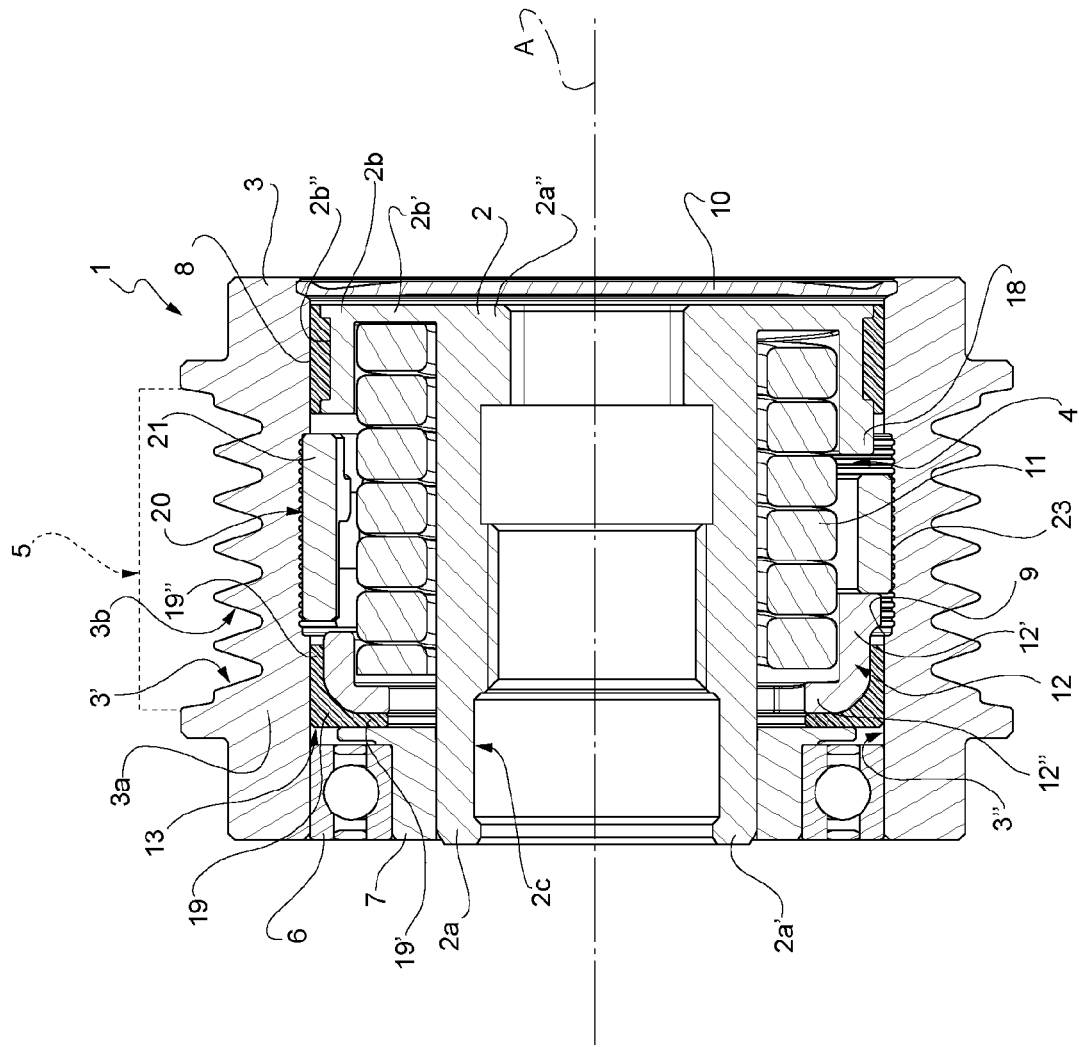
FIG. 1 is a longitudinal cross-section view of a pulley according to the invention.
Figure 2:
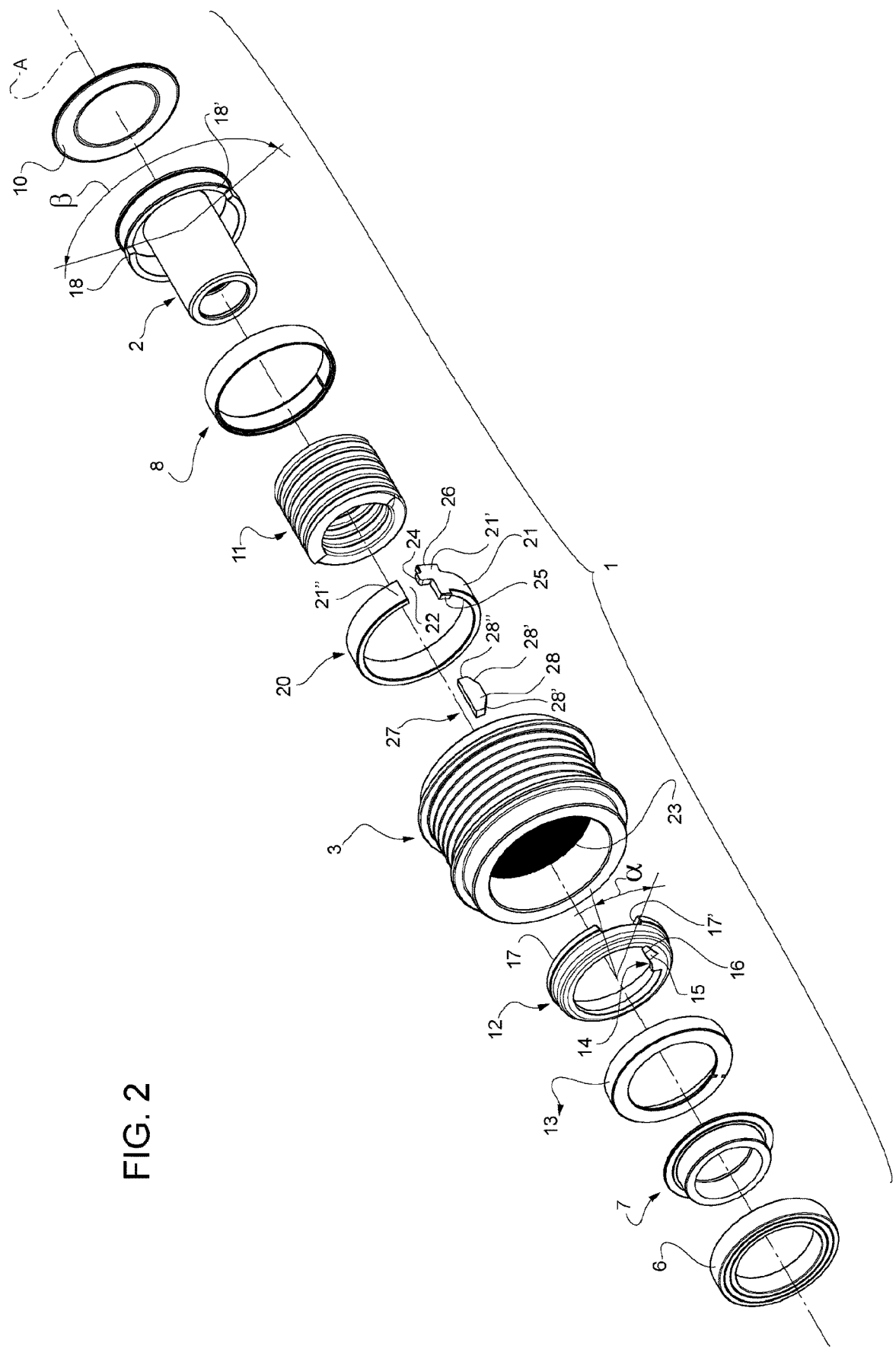
FIG. 2 is an exploded perspective view of the pulley in FIG. 1.
Figure 3:
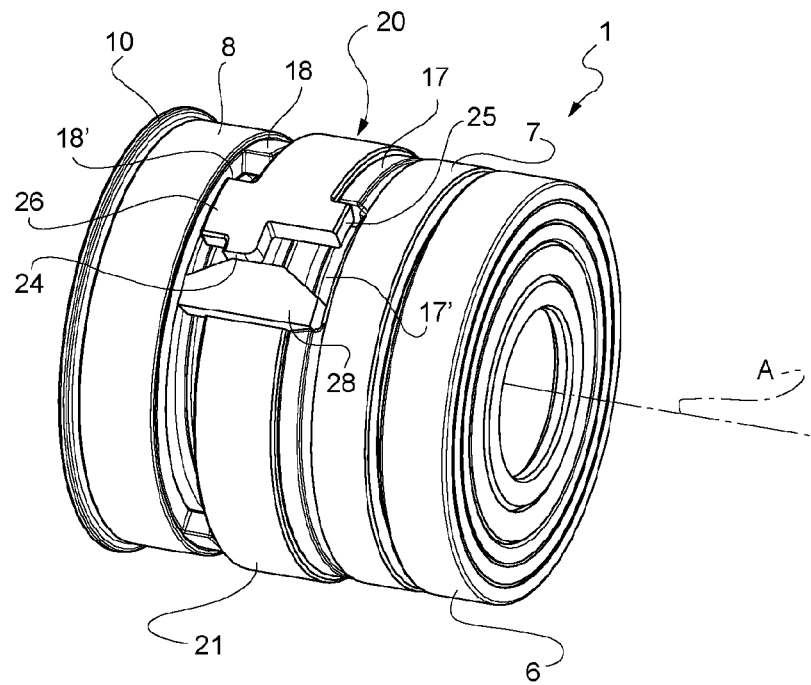
FIGS. 3 and 4 are perspective views, respectively from different angles, of the pulley in FIG. 1 with parts removed for clarity.
Figure 4:
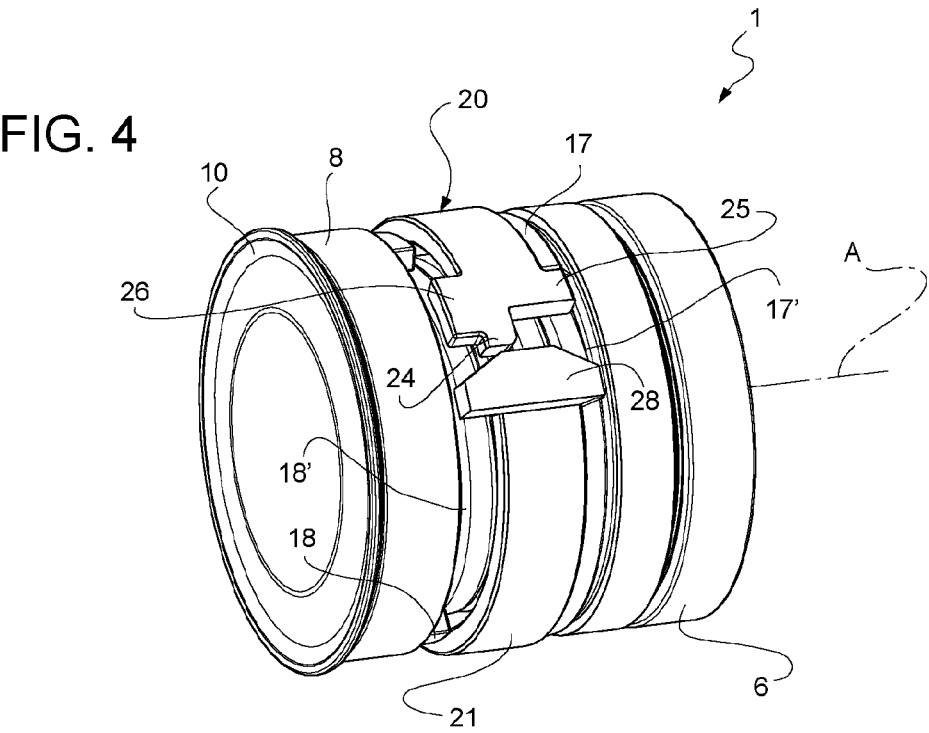

With reference to FIGS. 1 and 2, a pulley 1 is illustrated that basically comprises a tubular hub 2, a tubular crown 3 externally coaxial to the hub 2 and supported so that it is rotationally free on the latter, and a filtering unit 4 for transmitting torque operatively interposed between the hub 2 and the crown 3. The hub 2 and the crown 3 are coaxial around a longitudinal axis A.

The hub 2 is designed to be rigidly fixed to a shaft, not illustrated, of an accessory component of an internal combustion engine, for example an alternator or a reversible electric motor with the function of alternator and drive motor in a start-stop system.

In particular, the hub 2 comprises a tubular cylindrical portion 2a defining, within, a coupling portion 2c with the above-mentioned shaft between a first end 2a' and a second end 2a" of the cylindrical portion 2a. The hub 2 comprises, in addition, a flanged portion 2b extending radially from one 2a" of the end portions towards the crown 3 and provided with a radial portion 2b' extending perpendicularly to the axis A and a longitudinal portion 2b" extending so that it overhangs the radial portion 2b' parallel to the axis A towards the other end 2a' of the hub 2.

The crown 3 basically comprises an annular portion 3a, which has a multiple-groove profile 3b designed to cooperate with a poly-V belt 5 (of which a cross-section is schematically represented in FIG. 1). The profile 3b is obtained on an outer surface 3' of the crown 3 opposite to an inner surface 3" cooperating with the filtering unit 4.

The crown 3 is supported on the hub 2 using rolling/sliding support means. In particular, the pulley 1 comprises a rolling bearing 6, for example a sphere bearing, radially interposed between the crown 3 and the first end 2a' of the hub 2. In particular, the rolling bearing 6 is supported on the hub 2 via a head element 7 attached to the first end 2a', due to pulley 1 assembly needs.

On the other hand, the pulley 1 comprises a sliding bearing 8, for example a ring made of low friction material, radially interposed between the crown 3 and the second end 2a" of the hub 2, i.e., between the longitudinal portion 2b" and the inner surface 3" of the crown 3.

Between the crown 3 and the hub 2 there is, thus, a space 9 that is radially delimited between the inner surface 3" of the crown 3 and by the outer surface of the cylindrical portion 2a of the hub 2 and axially delimited between the rolling/sliding support means described above.

The pulley 1 may, in addition, comprise a lid 10 configured to axially delimit one of the ends of the pulley 1 and, advantageously, configured to be housed within the crown 3, i.e., radially cooperating in contact with the latter.

The filtering unit 4 is housed in the space 9 and basically comprises a torsion spring 11, a spring holder element 12, said carrier below, cooperating with one end of the spring 11, and a damping ring 13 axially interposed between the carrier and the head element 7.

Figure 5:
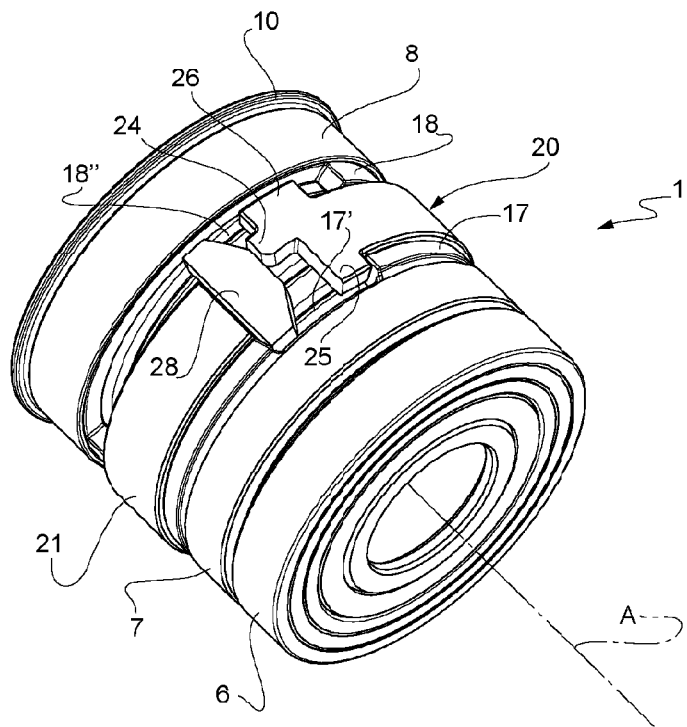
FIGS. 5 and 6 are perspective views of respective elements that are part of the pulley according to the invention.
Figure 6:
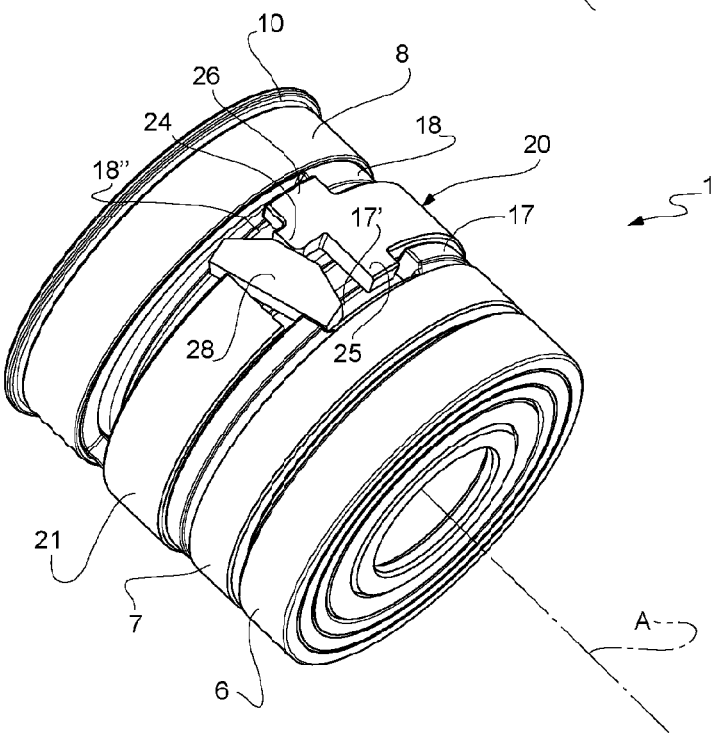

The carrier 12 cooperates in contact by sliding, i.e., it axially slides in contact, with the head element 7. Referring to FIGS. 1 and 5, the carrier 12 is ring-shaped and defines an annular wall 12' coaxial to the axis A and a radial wall 12" extending radially towards the axis A beginning from an axial edge of the annular portion 12'.

This radial wall 12" is configured to cooperate by sliding with the head 7 on a first side, while on a second side opposite the previous one, it defines an inner radial protrusion 14 configured to house a spring-stop element 15. In particular, the spring-stop element 15 comprises an axial projection 16 extending axially along the axis A from the inner radial protrusion 14 and configured to cooperate in contact with one end of the spring 11.

The annular wall 12' also defines an axial projection 17 extending axially along the axis A from the axial edge of the annular portion 12' opposite the radial wall 12", the function of which will be described below. In particular, the axial projection 17 extends circumferentially around the axis A, leaving a seat 17' free of an angle α ranging between 35° and 45°, preferably 40°.

As can be seen in FIGS. 3 to 6, the longitudinal portion 2b" of the hub 2 defines a projection 18 extending axially along the axis A, in relation to the longitudinal portion 2b" towards the carrier 11. In particular, the axial projection 18 extends circumferentially around the axis A, leaving a seat 18' free of an angle β ranging between 130° and 150°, preferably 140°.

The spring 11 is, preferably, a helical spring with wire of a rectangular cross-section and comprising multiple coils wrapping around the axis A between the carrier 12 and the flanged portion 2b of the hub 2. As mentioned above, an end portion of the spring 11 cooperates in contact with the spring holder 15 while the opposite end cooperates in contact with a respective spring holder, not visible, made in the flanged portion 2b. As a result, the flanged portion 2b is configured to externally wrap, in part, the spring 11.

The damper 13 basically comprises the annular element 19 made of polymer that has an "L"-shaped cross section and, thus, is provided with a longitudinal portion 19' radially interposed between the carrier 12 and the inner surface 3" of the crown 3 and an axial portion 19" axially interposed between the carrier 12 and the head 7. The annular element 19 is coupled, by friction or by coupling with the shape, to the carrier 12 and, thus, is not integral around the axis A.

The pulley 1 also comprises a torque-limiting joint 20 basically comprising a strip spring 21 (FIGS. 3 to 6) housed in the space 9 and configured to fulfil, at the same time, the function of free wheel in both relative rotation directions between crown 3 and hub 2. Advantageously, this free wheel effect is provided at different levels of torque that can be transmitted between hub 2 and crown 3 in one direction compared to another.

In particular, the torque-limiting joint 20 is sized in order to cooperate in contact with the hub 2 and the carrier 12 in order to decouple the crown 3. In particular, the limiting joint 21 is housed in the space 9 in contact with the inner surface 3" of the crown 3.

In more detail, the strip spring 21 has a basically open-ring shape with two ends 21', 21" delimiting a space 22 between them. The strip spring 21 is mounted with radial interference inside the inner radial surface 3" of the crown 3, in particular in a machined area 23. In particular, the area 23 is machined in order to define a grooved/wavy surface, of the paracentric type, with dimensions designed to enable a predetermined friction between the strip spring 21 and crown 3.

The strip spring 21 has a basically constant axial dimension across the entire circumferential extension and preferably has a rectangular cross-section.

In any case, one 21' of the two end portions 21" defines at least one projection 24, 25, 26. In particular, according to the embodiment described,

- a first projection 24 extends in a circumferential direction beginning with the end portion 21' towards the end portion 21" opposite the inside of the space 22
- a second projection 25 extends axially along the axis A from an axial edge of the strip spring 21 towards the carrier 12; and
- a third projection 26 extends axially along the axis A from an axial edge of the strip spring 21 towards the flanged portion 2b of the hub 2.

In particular, the first projection 24 extends near the third projection 26.

The second projection 25 is axially sized to cooperate in contact in the circumferential direction with the projection 17 defined by the carrier 12 while the third projection 26 is axially sized to cooperate in contact in the circumferential direction with the projection 18 defined by the hub 2.

The torque-limiting joint 20 also comprises an actuator element 27 housed in the space 22 and configured to cooperate in contact with the projections 17, 18 to increase or decrease the opening of the strip spring 21 when the actuator element acts with them.

Advantageously, the actuator element 27 comprises a metallic lever 28 housed in the space 22 and circumferentially interposed between the end portions 21', 21" of the strip spring 21 and configured to cooperate in contact with the projection 24 and the end portion 21", circumferentially, and extending in the axial direction to cooperate in contact, circumferentially, with the projections 17 of the carrier 12 and 18 of the hub 2.

In particular, the lever 28 has a trapezoidal shape where the plan of the trapezoidal shape is circumferential and the thickness is radial in relation to the axis A. In particular, thus, the lever 28 comprises a central portion 28' with a basically rectangular shape and a pair of tapered lateral portions 28" that are, advantageously, equal to each other.

The angle of inclination of the lateral portions 28" in relation to the central portion 28' preferably ranges between 20° and 40°, advantageously 30°.

The operation of the embodiment of the pulley 1 according to the invention described above is the following.

In normal conditions, i.e., when the crown 3 driven by the belt 4 drives the hub 2 and, thus, tends to overrun it ("drive mode"), the spring 21 rotates integrally with the crown 3 and the hub 2 is resistant.

Imagining a starting condition wherein one of the lateral portions 28" of the actuator 28 is in contact with the projection 18, the strip spring 21 will tend to move clockwise in relation to the axis A driven by the crown 3. The actuator 28 moves inside the seat 18' (FIG. 5) until (FIG. 6) the projection 26 of the spring 21 enters into contact with the projection 18. Starting from this condition, the lever 28 is arranged inclined since pushed tangentially between the portions 21', 21" by the thrust between the projection 17 and the opposite lateral portion 28". In this way, the opening thereof is increased, increasing the adherence between the latter and the inner surface of the crown 3. During this movement, the projection 25 acts in contact with the projection 17 of the head element 7. In this way, the spring 11 is charged with torsion and transmits torque to the hub 2 being attached to the opposite flanged portion 2b. If the torque transmitted by the crown 3 continues to increase, at a certain point, the strip spring 21 slides in relation to the inner surface 3" of the crown 3, lacking the necessary adherence and, thus, decoupling the crown 3 and the hub 2.

If, instead, the hub 2 tends to overrun the crown 3 ("overrunning"), the spring 21 rotates integrally with the crown 3 and is resistant to the hub 2.

Imagining its being in the decoupling condition described earlier, the crown 3 will tend to rotate anticlockwise in relation to the hub 2 decoupling the lever 28 from the projection 18. In this condition, the spring 11 will tend to discharge and the strip spring 21, borne by the crown 3, will continue to rotate anticlockwise driven by the projection 17 in contact with the projection 25 inside the seat 17'. This condition continues until the lateral portion 28" of the lever 28 contacts the projection 17 on the other side of the seat 17 and tends to close the spring 21 that slides.

If there is no lever 28, the operation is similar and in the driving torque condition, the coupling occurs directly between the projections 17, 18 and 25, 26.

From the above, the advantages of a pulley 1 according to the invention are clear.

In relation to the known solutions that involve the use of a free wheel, this invention equipped with a torque-limiting joint 20 makes it possible to obtain bi-directional coupling between hub and pulley, at least within a predetermined range of torques, making it possible to use the pulley in start-stop systems.

In relation to the solutions described, the angular limitation function is directly performed by the appropriately sized torque-limiting joint 20. In particular, thanks to the angular intervals a, B, which are different to each other, it is possible to optimise these values between driving torque and overrunning.

In particular, the angle β is particularly reduced in order to ensure the sliding of the spring as soon as an overrun condition is detected, thus avoiding collisions that cause noise and reduce the service life of the pulley 1.

In addition, the trapezoidal shape of the lever 28 is particularly optimised in order to ensure the opening of the spring 21 and, at the same time, enough structural resistance.

In general, the filtering pulley illustrated here has small radial and axial dimensions and has a limited number of elements. Thus, it is inexpensive to manufacture and its assembly is easier.

Finally, it is clear that changes may be made to the pulley 1, and variations produced thereto, according to this invention that, in any case, do not depart from the scope of protection defined by the claims.

In particular, the spring 21 could be coupled to the hub 2 instead of to the crown 3.

The lever 28, as mentioned, may be omitted if the adherence between the spring 21 and the surface 3" of the crown 3 (or of the hub 2) in the "drive mode" is enough to transmit the torque required.

Clearly, the angular values of the seats 17' and 18' may vary depending on the need of the vehicular transmission.

The pulley may be used as a drive pulley on the engine shaft instead of on the alternator and may also be used on a conventional alternator or on any other accessory.

The invention claimed is:

1. Filtering pulley for an accessory transmission of an internal combustion engine, comprising a hub, an annular crown provided with a profile configured to cooperate with a transmission belt, externally coaxial around an axis to said hub and supported in free rotational motion on the hub itself, and a filtering unit for transmitting the torque interposed between said hub and said crown and comprising a torsion spring, a carrier and a torque limiting joint, said carrier cooperating by sliding with respect to a portion integral with one of said hub and said crown, said carrier defining a spring holder and a projection extending along said axis and configured to cooperate with said torque limiting joint, said torsion spring being operatively interposed between said carrier and said one between said hub and said crown and being provided with two ends cooperating in contact with respective spring holders integral with said carrier and said one between said hub and said crown, said torque limiting joint being coupled by interference on one surface of the other between said crown and said hub said torque limiting joint comprising an open loop strip spring and being configured to slide with respect to said surface when the torque transmitted between said crown and said hub reaches a predetermined level, wherein said strip spring defines a pair of axial projections configured to cooperate selectively circumferentially in contact with, respectively, at least one axial projection integral with said hub and at least one projection axial integral with said carrier.

2. The pulley according to claim 1, wherein said axial projection carried by said hub defines a seat within which said axial projection can move circumferentially, said seat extending angularly by an angle included between 130° and 150°.

3. The pulley according to claim 1, wherein said axial projection carried by said carrier defines a seat within which said axial projection can move circumferentially, said seat extending angularly by an angle included between 35° and 45°.

4. The pulley according to one of claim 1, wherein said torque limiting joint comprises an actuator element housed in a space circumferentially delimited between two ends of said strip spring, said actuator element being axially dimensioned to cooperate in contact, on the one hand, with said projection of said carrier and, on the other, said projection of said hub.

5. The pulley according to claim 4, wherein said actuator element is a metal lever able to expand said spring under the thrust of said projection of said carrier.

6. The pulley according to claim 4, wherein one of said two ends of said strip spring defines a circumferential protuberance extending into said space and configured to cooperate in contact with said actuator element, said protuberance extending in proximity of said axial projection cooperating with said projection integral with said hub.

7. The pulley according to claim 4, wherein said actuator element has a trapezoidal section, where the plan of said section is circumferential and the thickness of said actuator element is radial.

8. The pulley according to claim 7, wherein said trapezoidal section defines a pair of equal inclined lateral portions.

9. The pulley according to claim 8, wherein the inclination of said inclined side portions is between 20° and 40°.

10. The pulley according to claim 1, wherein said portion integral with said hub comprises an annular head on which a bearing is mounted to support said crown.

11. The pulley according to claim 1, wherein said projections are made on a flanged portion integral with said hub, said flanged portion being sized to wrap, in part, externally said torsion spring.

12. The pulley according to claim 11, wherein said pulley comprises a sliding bearing operatively interposed between said flanged portion and said crown.

13. The pulley according to claim 1, wherein said carrier defines a radial projection defining a spring holder for one of the two ends of said torsion spring.

14. The pulley according to claim 1, wherein said pulley comprises a damping ring operatively interposed between said carrier and said portion integral with said hub, said damping being configured to allow the sliding of said carrier with respect to said portion.

15. The pulley according to claim 14, wherein said damping ring comprises a portion radially interposed between said crown and said carrier and a portion interposed between said carrier and said portion integral with said hub.

* * * * *